United States Patent [19]

Omoto et al.

[11] 3,800,029

[45] Mar. 26, 1974

[54] PROCESS FOR RECOVERING SODIUM FLUOSILICATE FROM WET PROCESS PHOSPHORIC ACID

[75] Inventors: Tsunehiko Omoto; Tadashi Inoue; Takanori Yazaki, all of Hikoshima, Japan

[73] Assignee: Mitsui Toatsu Chemicals, Incorporated, Tokyo, Japan

[22] Filed: Feb. 17, 1971

[21] Appl. No.: 116,213

[30] Foreign Application Priority Data
Feb. 27, 1970 Japan................................ 45-18743

[52] U.S. Cl................................ 423/321, 423/341
[51] Int. Cl. ...................... C01b 25/16, C01b 33/08
[58] Field of Search................... 23/88, 165 B, 165; 423/321, 341

[56] References Cited
UNITED STATES PATENTS

| | | | |
|---|---|---|---|
| 3,462,242 | 8/1969 | Barker et al. | 23/88 |
| 3,554,694 | 1/1971 | Barker et al. | 23/88 |
| 2,556,064 | 6/1951 | Caldwell et al. | 23/88 |
| 3,442,609 | 5/1969 | Carothers et al. | 23/165 |
| 3,493,336 | 2/1970 | Milling | 23/107 |
| 3,607,016 | 9/1971 | Barilli et al. | 23/88 |

*Primary Examiner*—Oscar R. Vertiz
*Assistant Examiner*—Gregory A. Heller
*Attorney, Agent, or Firm*—Fisher, Christen & Sabol

[57] ABSTRACT

Sodium fluosilicate of high quality is recovered from wet process phosphoric acid by adding a sodium compound to phosphoric acid not containing substantial amount of fluosilicic acid dissolved therein to form an aqueous solution containing phosphoric acid and sodium dihydrogen-phosphate, adding said aqueous solution to wet process phosphoric acid containing fluosilicic acid dissolved therein and separating the resulting sodium fluosilicate crystals from the defluorinated phosphoric acid.

7 Claims, No Drawings

PROCESS FOR RECOVERING SODIUM FLUOSILICATE FROM WET PROCESS PHOSPHORIC ACID

This invention relates to an improved process for recovering sodium fluosilicate from wet process phosphoric acid.

In general, 1.5 – 3.0 percent of fluorine is contained as fluorine compounds such as fluosilicic acid in wet process phosphoric acid. These fluorine compounds hinder applications of wet process phosphoric acid for the preparation of chemicals so that they have been in general removed as insoluble fluosilicates by adding alkaline metal compound in the purification of wet process phosphoric acid. In this case, the crystal form and the purity of fluosilicates are almost beside the question when the removal of fluorine compounds contained in the wet process phosphoric acid is merely intended; however, the crystal form and the purity of fluosilicates are of importance when the recovery of high quality fluosilicates from the wet process phosphoric acid is intended. As sodium compounds which are used in the recovery of sodium fluosilicate from the wet process phosphoric acid, there are known caustic soda, sodium chloride, carbonate, sulfate and silicate etc. Among these sodium compounds, sodium chloride, sulfate and silicate are used not preferably because they leave a superfluous anion such as hydrochloric, sulfuric or silicic acid in the treated phosphoric acid. Caustic soda does not leave a superfluous anion in the treated phosphoric acid but the reaction with fluosilicic acid is proceeded very rapidly due to its strong alkalinity, resulting in the formation of pasty slurry containing very fine crystals of sodium fluosilicate. Thus, the separation of sodium fluosilicate crystal by filtration etc. is hindered and as large amount of phosphoric acid is accompanied by the resulting sodium fluosilicate cake, the purity of the sodium fluosilicate is lowered and the drying of the sodium fluosilicate cake is difficult due to the high water content of the cake after the washing with water. The direct use of strong alkali such as caustic soda forms locally strongly alkaline areas about places added with caustic soda, resulting in that impurities, which are dissolved in the wet process phosphoric acid, such as iron and aluminum are co-precipitated to lower the purity of sodium fluosilicate product disadvantageously.

From these reasons as mentioned above, sodium carbonate has been used as the most general defluorinating agent for wet process phosphoric acid but comparatively strong alkaline nature not so as that of caustic soda results in inevitable disadvantages as mentioned above, such as the fineness of the resulting sodium fluosilicate crystal, the contamination of product resulted from the co-precipitation of impurities, etc.

In the industrial recovery of sodium fluosilicate from the wet process phosphoric acid, a special care should be taken for the filtration of sodium fluosilicate precipitate and the large amount of phosphoric acid or washing water accompanied by the sodium fluosilicate cake lowers the purity of product, color shade or capacity of dryer disadvantageously and, therefore, the fineness of sodium fluosilicate crystal should be avoided. Therefore, when strong alkaline compounds such as caustic soda and sodium carbonate are added directly to the wet process phosphoric acid to recover sodium fluosilicate of high quality and of as large crystal size as possible, the process wherein an alkali metal compound and/or wet process phosphoric acid is diluted with water is employed, but this process is not economical in lowering both the concentration of treated phosphoric acid and the recovery rate of fluorine.

An object of this invention is to provide an improved process for recovering sodium fluosilicate of high purity and large crystal size from the wet process phosphoric acid.

Another object of this invention is to provide an improved process wherein the defluorination of wet process phosphoric acid can be carried out without the substantial dilution of phosphoric acid.

The subject matter of the present invention: In a process for recovering sodium fluosilicate from wet process phosphoric acid in which an amount of sodium compound sufficient for precipitating fluosilicic acid contained in said phosphoric acid as sodium fluosilicate is added to said wet process phosphoric acid as a defluorinating agent to precipitate fluosilicic acid as sodium fluosilicate thereby forming sodium flosilicate suspending phosphoric acid and crystals of said sodium fluosilicate is separated therefrom to leave the defluorinated phosphoric acid, that improvement which comprises adding to a part of said sodium fluosilicate suspending or defluorinating phosphoric acid a sodium compound in such amount that may not occur the precipitation of impurities such as iron and aluminum dissolved in phosphoric acid to form an aqueous solution containing phosphoric acid and sodium dihydrogenphosphate and using said aqueous solution as said defluorinating agent.

In comparison with the use of crystal or solution of purified sodium phosphate such as sodium dihydrogenphosphate or disodium hydrogen phosphate of industrial grade, the defluorinating agent used in the process according to this invention is very economically an aqueous solution containing phosphoric acid and sodium dihydrogenphosphate obtained by adding to the sodium fluosilicate-suspending or defluorinated phosphoric acid (It shall be hereafter referred to as "the treated phosphoric acid") a sodium compound in such amount that may not precipitate impurities dissolved in the phosphoric acid. The concentration of sodium ion depends on the amount of the treated phosphoric acid and of sodium compound added and can be reduced by increasing the amount of phosphoric acid. Preferably, before the defluorination, the wet process phosphoric acid is clarified by removing suspended materials such as organic substance and gypsum. As means for the purification, for example, the filtration through a filtration agent is employed. As filtration agent, as described in U.S. Pat. No. 3,506,394, calcium sulfate dihydrate is used preferably which is obtained by hydrating calcium sulfate semi-hydrate in water or phosphoric acid. If the slurry containing 1 – 10 percent of fine crystals of sodium fluosilicate which is obtained by treating sodium fluosilicate-suspending phosphoric acid by means of wet classification etc. is used for the preparation of aqueous solution containing phosphoric acid and sodium dihydrogenphosphate, these fine crystals act as seeds preferably to form sodium fluosilicate of large crystal size in the defluorination step (sodium fluosilicate forming step).

The pH-value at which impurities such as iron and aluminum dissolved in wet process phosphoric acid begin to precipitate in the neutralization of wet process phosphoric acid, depends on the kind (depending on the brand and the acid-digestion condition of phosphate rock used) and the concentration of wet process phosphoric acid and in general is in range of 1.6 – 1.9. Accordingly, the pH-value of aqueous solution containing phosphoric acid and sodium dihydrogenphosphate and being used in the defluorination step according to this invention is necessarily less than about 1.5.

Hitherto, neutral or strongly alkaline sodium compounds (defluorinating agent) have been used in the defluorination of wet process phosphoric acid. On the contrary, in the process according to this invention, an aqueous solution containing phosphoric acid and sodium dihydrogenphosphate of a pH-value less than about 1.5 is used and the reaction with fluorine compound such as fluosilicic acid contained in the wet process phosphoric acid is proceeded under a very mild condition resulting in sodium fluorilicate crystals of very larger crystal size than those obtained in the previous process, said crystals being excellent in the filtration and the washing and containing little phosphoric acid and other impurities therein.

According to results obtained at both laboratory and plant, sodium fluosilicate having a crystal size of 20 – 40$\mu$ and a purity more than 99.5 percent are constantly obtained. On the contrary, in the previous conventional process by adding caustic soda or sodium carbonate directly to the phosphoric acid to be treated, the resulting sodium fluosilicate consists of fine pasty crystals of particle size less than about 3$\mu$ and has a purity of 98.0 – 99.0 percent.

As sodium compounds to be used for the preparation of an aqueous solution containing phosphoric acid and sodium dihydrogenphosphate, sodium compounds used previously, for example, sodium chloride, sodium sulfate, caustic soda, sodium carbonate and sodium silicate can be used; caustic soda and sodium carbonate are most preferable as they do not provide superfluous anions to the treated phosphoric acid.

In this invention, as mentioned above, a sodium compound is added to the treated phosphoric acid and the resulting aqueous solution containing phosphoric acid and sodium dihydrogenphosphate is used as defluorinating agent. The amount of the treated phosphoric acid circulated to the defluorination step is not constant depending on the defluorination rate and is preferably corresponding to about 10 – 40 per cent by weight of the amount of the starting wet process phosphoric acid for the use of an aqueous solution containing phosphoric acid and sodium dihydrogen-phosphate. When caustic soda or sodium carbonate is used as sodium compound the above-mentioned phosphoric acid circulated is preferably neutralized to a pH of about 1.5.

The preferable amount of sodium ion in the aqueous solution which contains phosphoric acid and sodium dihydrogenphosphate and is added to wet process phosphoric acid to be defluorinated is nearly equivalent to the stoichiometric amount for precipitating fluosilicic acid contained therein as sodium fluosilicate.

In the process, according to this invention, even if strongly alkaline compound such as caustic soda is used, the preparation of an aqueous solution containing phosphoric acid and sodium dihydrogenphosphate and the precipitation of sodium fluosilicate by adding said aqueous solution to wet process phosphoric acid are carried out independently so that the contamination of sodium fluosilicate resulted from the co-precipitation of impurities can be avoided. That is to say, in the preparation of said aqueous solution containing phosphoric acid and sodium dihydrogenphosphate, even if the addition of a sodium compound causes to form locally strongly alkaline areas and the precipitate of impurities such as iron and aluminum, the solution as a whole is still considerably acidic, so that the precipitate once formed of impurities is dissolved again until the precipitation of sodium fluosilicate and does not contaminate the sodium fluosilicate product. As described above, it is one of the features of the process according to this invention that strongly alkaline compounds such as caustic soda, which have been used difficultly hitherto, can be used without an excess dilution with water.

According to the process of this invention, sodium fluosilicate crystals of large and uniform crystal size, such as 20 – 40$\mu$, can be obtained, which can be separated readily from the treated wet process phosphoric acid. At the same time, the amount of phosphoric acid contained in the cake is highly reduced to render easily the washing resulting in a high quality product having a purity more than 99.5 percent and an improvement in the drying capacity of dryer. It is not necessary to dilute the starting wet process phosphoric acid, so that the concentration of defluorinated phosphoric acid is not lowered; therefore, the expensive step such as concentration is not required in the subsequent processes.

The following example illustrates the invention but is not to be construed as limiting. All parts and percentages are on weight basis.

EXAMPLE

About 17 parts of an aqueous solution containing phosphoric acid and sodium dihydrogenphosphate having a pH-value of 1.5, in which about 40 g/l of fine sodium fluosilicate crystals was suspended, were fed with stirring in 100 parts of clarified wet process phosphoric acid containing no suspending solid such as gypsum and organic substance and having the composition of $P_2O_5$ 30.5 percent, $SO_3$ 1.9 percent, F 2.8 percent, $Fe_2O_3$ 0.82 percent, $Al_2O_3$ 0.43 percent, CaO 0.29 percent, MgO 0.26 percent, $Na_2O$ 0.12 percent and $SiO_2$ 1.53 percent and reacted at 65°C. The precipitation of sodium fluosilicate was completed after about 30 min. The resulting suspension was introduced into a thickener to separate about 14 parts of overflow liquid suspending about 45 g/l of fine sodium fluosilicate crystals and 3 parts of 47 percent aqueous caustic soda were added thereto to prepare said aqueous solution having a pH-value of 1.5. It was used as defluorinating agent in the subsequent batch of defluorination step. On the other hand, a slurry containing large crystals of sodium fluosilicate was recovered from the bottom of thickner and filtered under vacuum to separate sodium fluosilicate crystals from the phosphoric acid. Water was added to the sodium fluosilicate cake containing a small amount of phosphoric acid to repulp. The whole was filtered after stirring and dried to yield pure white crystals of sodium fluosilicate having a purity of 99.7 percent, a total phosphoric acid content ($P_2O_5$) of 0.12 percent and a water content of 0.15 percent. The crystal size of dried product was 20 – 40$\mu$ and almost uniform. At the same time, the defluorinated phosphoric acid containing $P_2O_5$ 30.2 percent, F 0.8 percent and $Na_2O$ 0.23 percent was recovered.

For comparison, the following experiment which does not illustrate the invention was made:

The same wet process phosphoric acid as used in the above example, was diluted with water to prepare a solution of $P_2O_5$ 27.8 percent. 47 percent caustic soda solution in an amount equivalent to that used in said example was added at 65°C to the solution and reacted for about 30 min. A fine precipitate of sodium fluosilicate was immediately formed to yield a suspension containing a pasty precipitate of sodium fluosilicate. Using the same devices as in said example, the whole was filtered under vacuum, added with water to repulp, filtered again after stirring and dried to yield sodium fluosilicate having a purity of 98.8 percent, a total phosphoric acid ($P_2O_5$) of 0.72 percent and a water content of 0.32 percent. The crystal size of dried product was $1 - 3\mu$. It was filtered and washed very difficulty due to the fineness of the crystal and the capacity of dryer was lowered at about 20 percent. At the same time, a defluorinated phosphoric acid containing $P_2O_5$ 26.9 percent, F 0.9 percent and $Na_2O$ 0.25 percent was recovered.

What is claimed is:

1. A process for recovering sodium fluosilicate having high purity and large crystal size from wet process phosphoric acid containing fluosilicic acid which comprises
   a. treating said wet process phosphoric acid with a sodium compound in an amount sufficient to precipitate fluosilicic acid contained therein as sodium fluosilicate thereby forming defluorinated phosphoric acid solution containing the resulting sodium fluosilicate crystals,
   b. dividing said defluorinated phosphoric acid containing sodium fluosilicate crystals into two portions, the first of said portions containing 1 to 10 weight percent of fine crystals of sodium fluosilicate and the second of said portions containing large crystals of sodium fluosilicate having a size from 20–40 microns,
   c. adding to the first of said portions a sodium compound to form a solution having a pH of less than about 1.5 and containing phosphoric acid and sodium dihydrogenphosphate,
   d. recycling and adding said solution to additional wet process phosphoric acid containing fluosilicic acid in step (a) to form sodium fluosilicate crystals therein, and
   e. recovering sodium fluosilicate crystals from the second of said portions.

2. A process as claimed in claim 1 wherein said sodium compound added to said first of said portions is a member selected from the group consisting of caustic soda, sodium carbonate, sodium silicate, sodium chloride and sodium sulfate.

3. A process according to claim 1 wherein the contained fluosilicate crystals are separated from said first of said portions prior to addition of said sodium compound.

4. A process as claimed in claim 1 wherein said first of said portions is the overflow from hydraulic classification of said defluorinated phosphoric acid containing sodium fluosilicate crystals.

5. A process as claimed in claim 1 wherein the amount of phosphoric acid in said solution containing phosphoric acid and sodium dihydrogen phosphate is from about 10 to about 40 percent by weight of said additional wet process phosphoric acid.

6. A process as claimed in claim 5 wherein said solution is neutralized to a pH of less than about 1.5 with a member selected from the group consisting of caustic soda and sodium carbonate.

7. A process for recovering sodium fluosilicate having high purity and large crystal size from wet process phosphoric acid containing fluosilicic acid, which process comprises: adding to phosphoric acid substantially free of fluosilicic acid a sodium compound to form a solution having a pH of less than about 1.5 and containing phosphoric acid and sodium dihydrogen phosphate; adding said solution to said wet process phosphoric acid in an amount sufficient to precipitate fluosilicic acid contained therein as sodium fluosilicate crystals; and recovering said sodium fluosilicate crystals.

* * * * *